No. 698,732. Patented Apr. 29, 1902.
A. A. NILSON.
JEWELER'S TOOL.
(Application filed May 28, 1901.)
(No Model.)
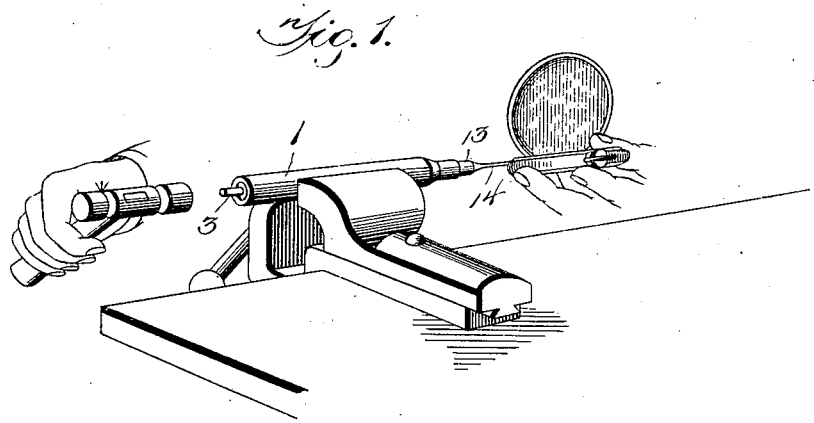
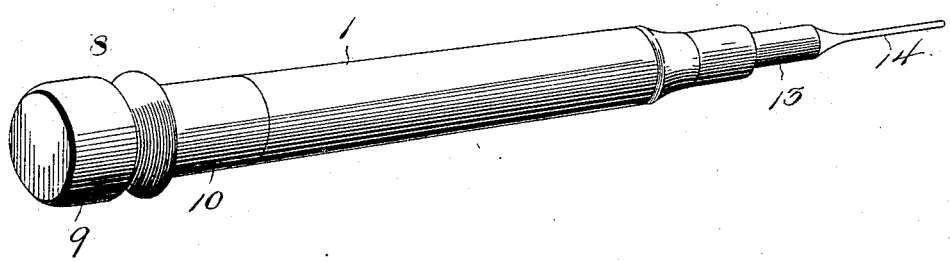
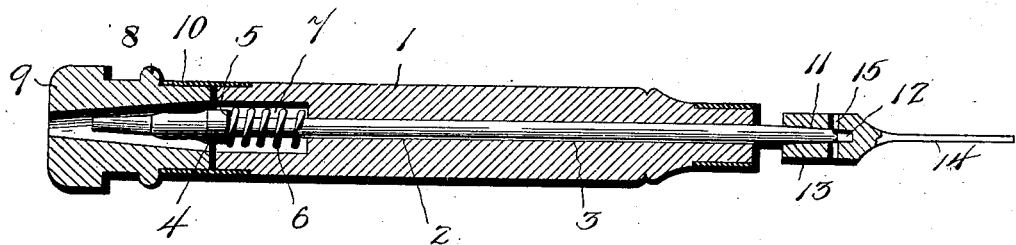
Witnesses
Albert A. Nilson
Inventor
by
Attorney

UNITED STATES PATENT OFFICE.

ALBERT A. NILSON, OF DENISON, TEXAS.

JEWELER'S TOOL.

SPECIFICATION forming part of Letters Patent No. 698,732, dated April 29, 1902.

Application filed May 28, 1901. Serial No. 62,179. (No model.)

*To all whom it may concern:*

Be it known that I, ALBERT A. NILSON, a citizen of the United States, residing at Denison, in the county of Grayson and State of Texas, have invented certain new and useful Improvements in Jewelers' Tools, of which the following is a specification.

This invention relates to tools for the use of jewelers and watchmakers, and has special reference to a simple and practical tool of this character for facilitating various kinds of work which are ordinarily somewhat difficult and awkward of accomplishment.

To this end the invention contemplates a jeweler's and watchmaker's tool which is easily handled and manipulated and capable of performing a variety of functions whereby the jeweler or watchmaker can conveniently and with facility perform different kinds of work—such, for instance, as extracting pins from watchcases and the like, as well as for stone-setting and such other uses as sometimes require a helper or assistant.

With these and many other objects in view, which will more readily appear as the nature of the invention is better understood, the same consists in the novel construction, combination, and arrangement of parts hereinafter more fully described, illustrated, and claimed.

The essential features of the invention are necessarily susceptible to some modification without departing from the spirit or scope thereof; but the preferred embodiment of the device is shown in the drawings, in which—

Figure 1 is a perspective view of a tool embodying the present invention and shown used in connection with a vise, thus enabling the watchmaker to extract the pin from a watch without an assistant or helper. Fig. 2 is a perspective view of the complete tool. Fig. 3 is an enlarged longitudinal sectional view of the tool.

Like numerals of reference designate corresponding parts in the several figures of the drawings.

In carrying out the invention all of the working parts thereof are associated with a tubular handle or barrel 1. This tubular handle or barrel is preferably of a cylindrical form and is of sufficient length to admit of the convenient handling of the tool, and said handle is provided with a central longitudinal guiding-bore 2, which slidably receives therein a reciprocatory punch-stem 3. The reciprocatory punch-stem 3 extends longitudinally the entire length of the tubular handle and is preferably formed at one end with a swelled portion 4, formed in any suitable manner and producing a bearing-shoulder 5, which bears against one end of the retracting coiled spring 6, seated and housed within a counterbored spring-cavity 7, formed within one end of the tubular handle. At the same end of the handle there is preferably associated therewith a detachable hand-cap 8, formed with a knob portion 9 for the hand to be pressed against, and also provided with an attaching-ferrule 10, which removably fits over one end of the tubular handle.

At the extremity opposite the swelled end 4 the reciprocatory punch-stem 3 is formed with a tapered terminal 11, which fits a correspondingly-shaped opening 12 in the socket 13, formed at one end of the punch-needle 14, and the tapered opening 12 intersects at its base a transverse pin-opening 15, through which is adapted to be inserted a pin when it is desired to loosen or remove the punch-needle 14. The punch-needle 14 is interchangeable with others of different sizes, in accordance with the character of work to be performed and especially according to the size of pin to be extracted from the watch or other article.

In the use of the device or tool as a pin-extractor the same may be placed in a vise, as shown in Fig. 1 of the drawings, and with the cap 8 removed the operator strikes with a hammer the end of the stem 3 opposite the needle 14, thereby imparting a jarring action to the needle, which serves to effectively displace or extract the pin from a watch or other article. The spring 6 exerts a retractive influence upon the stem, as will be readily understood.

With the cap 8 in position the tool can be employed as a hand-push device for such uses as may be required by the jeweler or watchmaker.

Various changes in the form, proportion, and minor details of construction may be resorted to without departing from the spirit or sacrificing any of the advantages of the invention.

Having thus described my invention, what I claim as new, and desire to secure by Letters Patent, is—

A tool of the class described comprising a tubular handle, a reciprocatory punch-stem extending through the handle and beyond both ends thereof, a retracting spring seated within the handle and engaging with the stem, a punch-needle having a socket member detachably engaging one end of the punch-stem, and a cap detachably fitting one end of the handle over the end of the stem opposite the punch-needle.

In testimony whereof I affix my signature in presence of two witnesses.

ALBERT A. NILSON.

Witnesses:
L. K. PURDDOW,
J. S. KANE.